(12) United States Patent
Eden et al.

(10) Patent No.: US 12,276,136 B2
(45) Date of Patent: *Apr. 15, 2025

(54) ANTI-THEFT MERCHANDISE HOOK

(71) Applicant: Fasteners for Retail, Inc., Twinsburg, OH (US)

(72) Inventors: Keith C. Eden, Rockford, IL (US); Shane Obitts, North Ridgeville, OH (US); Brent O. Ewing, Roscoe, IL (US); Chan Chor Man, Tai Po N.T. (HK)

(73) Assignee: Fasteners for Retail, Inc., Twinsburg, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/639,213

(22) Filed: Apr. 18, 2024

(65) Prior Publication Data

US 2024/0263492 A1  Aug. 8, 2024

Related U.S. Application Data

(63) Continuation of application No. 18/181,000, filed on Mar. 9, 2023, now Pat. No. 11,988,024, which is a
(Continued)

(51) Int. Cl.
*E05B 73/00* (2006.01)
*A47F 1/12* (2006.01)
(Continued)

(52) U.S. Cl.
CPC .............. *E05B 73/00* (2013.01); *A47F 1/128* (2013.01); *A47F 5/0006* (2013.01);
(Continued)

(58) Field of Classification Search
CPC .... A47F 5/0823; A47F 5/0861; A47F 5/0869; A47F 1/128; A47F 5/0006; A47F 7/143;
(Continued)

(56) References Cited

U.S. PATENT DOCUMENTS 3,785,501 A    1/1974  Canning
4,289,242 A    9/1981  Kenyon
(Continued)

FOREIGN PATENT DOCUMENTS

KR          101210320 B1    12/2012
WO      WO 2015/020754 A1    2/2015
(Continued)

*Primary Examiner* — Jennifer E. Novosad
(74) *Attorney, Agent, or Firm* — Reinhart Boerner Van Deuren P.C.

(57) ABSTRACT

An anti-theft merchandise hook that includes a top wire connected to a housing and to a mounting portion, used to mount the anti-theft merchandise hook to a stationary surface, at an end of the top wire. A bottom wire is attached to the mounting portion and extends from the mounting portion towards the housing. The bottom wire is configured to hold retail merchandise. A hanger is at least partially disposed within the housing. The hanger is configured to move between a closed position in which the hanger abuts the bottom wire, and an open position in which the hanger is spaced some distance from the bottom wire. A motor is configured to move the hanger between the closed position and the open position.

22 Claims, 9 Drawing Sheets

Related U.S. Application Data continuation of application No. 17/855,359, filed on Jun. 30, 2022, now Pat. No. 11,643,850, which is a continuation-in-part of application No. 17/545,469, filed on Dec. 8, 2021, now Pat. No. 11,680,427.

(60) Provisional application No. 63/123,299, filed on Dec. 9, 2020.

(51) Int. Cl.
  *A47F 5/00* (2006.01)
  *A47F 5/08* (2006.01)
  *G02B 6/38* (2006.01)
  *G08B 13/14* (2006.01)

(52) U.S. Cl.
  CPC .......... *A47F 5/0823* (2013.01); *A47F 5/0861* (2013.01); *A47F 5/0869* (2013.01); *G02B 6/3843* (2013.01); *G02B 6/3885* (2013.01); *G08B 13/149* (2013.01)

(58) Field of Classification Search
  CPC ... G02B 6/3843; G02B 6/3885; G08B 13/149
  USPC ........ 211/7, 57.1, 59.1; 385/78; 70/57.1, 62; 340/568.1
  See application file for complete search history.

(56) References Cited

U.S. PATENT DOCUMENTS

| | | | |
|---|---|---|---|
| 4,394,909 A | 7/1983 | Valiulis et al. | |
| 4,462,497 A | 7/1984 | Maule | |
| 4,474,300 A | 10/1984 | Entis | |
| 5,144,820 A | 9/1992 | Holmgren | |
| 5,971,593 A | 10/1999 | McGrady | |
| 6,439,423 B1 | 8/2002 | Suzuki | |
| 6,474,478 B1 | 11/2002 | Huehner et al. | |
| 6,659,291 B2* | 12/2003 | Huehner | A47F 5/0861 211/4 |
| 6,957,555 B1 | 10/2005 | Nagel et al. | |
| 7,197,902 B1 | 4/2007 | Barkdoll | |
| 7,269,983 B1 | 9/2007 | Mchatet | |
| 7,533,784 B2 | 5/2009 | Vlastakis et al. | |
| 7,559,437 B2 | 7/2009 | Colelli et al. | |
| 7,591,422 B2 | 9/2009 | Maitin | |
| 7,703,308 B2* | 4/2010 | Nagelski | A47F 5/0861 70/57.1 |
| 8,307,995 B2 | 11/2012 | Surma et al. | |
| 8,341,987 B2 | 1/2013 | Nagelski | |
| 8,523,012 B2 | 9/2013 | Richardson et al. | |
| 8,534,469 B2 | 9/2013 | Northrup, Jr. et al. | |
| 8,629,772 B2 | 1/2014 | Valiulis et al. | |
| 8,684,227 B2 | 4/2014 | Richardson et al. | |
| 8,777,020 B2 | 7/2014 | Winig et al. | |
| 8,842,011 B2 | 9/2014 | Casey | |
| 9,013,306 B2 | 4/2015 | Koh et al. | |
| 9,675,184 B2 | 6/2017 | Xin | |
| 9,820,587 B1 | 11/2017 | Cheng et al. | |
| 10,111,540 B2 | 10/2018 | Brej | |
| 10,121,341 B2* | 11/2018 | Ewing | G08B 13/1472 |
| 10,219,636 B2 | 3/2019 | Berglund et al. | |
| 10,334,964 B2 | 7/2019 | Hachmann | |
| 10,339,495 B2 | 7/2019 | Swafford et al. | |
| 10,420,427 B2 | 9/2019 | Hachmann | |
| 10,426,278 B2 | 10/2019 | Valiulis et al. | |
| 10,694,871 B1 | 6/2020 | Vogler et al. | |
| 11,006,768 B2 | 5/2021 | Berglund et al. | |
| 11,087,601 B1 | 8/2021 | Ewing et al. | |
| 11,154,144 B2 | 10/2021 | Bird et al. | |
| 11,363,894 B2 | 6/2022 | Ewing et al. | |
| 11,403,906 B2 | 8/2022 | Hua et al. | |
| 11,643,850 B2* | 5/2023 | Eden | A47F 5/0823 385/78 |
| 11,680,427 B2* | 6/2023 | Eden | G02B 6/3885 211/7 |
| 11,988,024 B2* | 5/2024 | Eden | G08B 13/149 |
| 2003/0029816 A1* | 2/2003 | Huehner | A47F 5/0861 211/8 |
| 2006/0261016 A1 | 11/2006 | Magid | |
| 2008/0142538 A1 | 6/2008 | Miller | |
| 2008/0209960 A1* | 9/2008 | Nagelski | A47F 5/0861 70/57.1 |
| 2010/0175438 A1 | 7/2010 | Sankey | |
| 2011/0036789 A1* | 2/2011 | Richardson | A47F 5/0861 211/1.57 |
| 2012/0253508 A1 | 10/2012 | Holmes | |
| 2014/0352372 A1 | 12/2014 | Grant et al. | |
| 2015/0096998 A1 | 4/2015 | Bird et al. | |
| 2016/0012692 A1 | 1/2016 | Grant et al. | |
| 2018/0211501 A1* | 7/2018 | Ewing | G08B 13/1481 |
| 2018/0296007 A1 | 10/2018 | Berglund et al. | |
| 2019/0279149 A1 | 9/2019 | Swafford et al. | |
| 2020/0323361 A1 | 10/2020 | Vogler et al. | |
| 2021/0030169 A1 | 2/2021 | Zhai et al. | |
| 2022/0178175 A1 | 6/2022 | Eden et al. | |
| 2022/0334323 A1 | 10/2022 | Eden et al. | |
| 2023/0250675 A1* | 8/2023 | Eden | G08B 13/14 70/58 |

FOREIGN PATENT DOCUMENTS

| | | |
|---|---|---|
| WO | WO 2020/218919 A1 | 10/2020 |
| WO | WO 2022/125664 A1 | 6/2022 |

* cited by examiner

ANTI-THEFT MERCHANDISE HOOK

CROSS-REFERENCE TO RELATED PATENT APPLICATIONS

This patent application is a Continuation of co-pending U.S. patent application Ser. No. 18/181,000, filed on Mar. 9, 2023, which is a continuation of U.S. patent application Ser. No. 17/855,359, filed Jun. 30, 2022, which issued as U.S. Pat. No. 11,643,850 on May 9, 2023, which is a continuation-in-part of U.S. patent application Ser. No. 17/545,469, filed Dec. 8, 2021, which issued as U.S. Pat. No. 11,680,427 on Jun. 20, 2023, which claims the benefit of U.S. Provisional Patent Application No. 63/123,299, filed Dec. 9, 2020, the entire teachings and disclosures of which are incorporated herein by reference thereto.

FIELD OF THE INVENTION

This invention generally relates to retail systems, and, more particularly, to theft detection systems for use in a retail environment.

BACKGROUND OF THE INVENTION

Loss prevention is a continuing problem in the retail industry. The retail industry is continually looking for better ways to prevent loss due to theft. Therefore, many retail environments incorporate various types of theft deterrence systems. Some current anti-theft systems involve locking up merchandise behind counters, often far away from related merchandise, or locking up the merchandise in secure cabinets, closer to the place where related merchandise is generally stored.

There are disadvantages to each of these methods. When merchandise is stored in a secured location away from the point of storage of related items, sales of the secured merchandise decrease because customers are less likely to go out of their way to locate a sales associate to retrieve the merchandise. When merchandise is stored in a secured cabinet near the point of storage of related items, sales of related items that would otherwise be situated in proximity to the secured merchandise decrease as well because the customer is not drawn to their location.

Therefore, although common anti-theft systems may be effective at preventing loss, they also have the significantly negative impact of reducing sales. Additionally, multiple secured storage devices may be costly to deploy in a retail setting, while taking up space that could be used other merchandise.

Accordingly, there exists a need in the art for an anti-theft system for retail stores that will deter theft without discouraging the sale of the merchandise and related items. Additionally, there is a need for anti-theft systems which can be retrofitted onto existing retail displays to keep the cost of installation and the shelving downtime required for installation as low as possible.

Embodiments of the present invention provide such an anti-theft system. This and other advantages of the invention, as well as additional inventive features, will be apparent from the description of the invention provided herein.

BRIEF SUMMARY OF THE INVENTION

In one aspect, embodiments of the invention provide an anti-theft merchandise hook having a top wire connected to a housing portion at one end of the top wire, and connected to a mounting portion at another end of the top wire opposite the one end. The mounting portion is used to mount the anti-theft merchandise hook to a stationary surface. The bottom wire is attached to the mounting portion, extending from the mounting portion toward the housing portion, and is configured to hold retail merchandise. A moveable hanger is at least partially disposed within the housing portion. The hanger is configured to move linearly between a closed position in which the hanger abuts the bottom wire, and an open position in which the hanger is spaced some distance from the bottom wire.

In particular embodiments, an end of the hanger that abuts the bottom wire is concave, and an end of the bottom wire that abuts the hanger is convex. In other embodiments, both the hanger and bottom wire include conductive material that form an electrical contact when the bottom wire that abuts the hanger, and the electronic circuitry of the anti-theft merchandise hook is configured to detect the electrical contact.

In some embodiments, the hanger includes a notch, and the hanger is configured to be manually moved into a locking position by a user, and locked into the closed position when a plunger, disposed within the housing portion is seated in the notch. In particular embodiments, the plunger is configured to move back and forth in a first direction perpendicular and the hanger is configured to move back and forth in a second direction perpendicular to the first direction. In a further embodiment, the plunger moves linearly back and forth, and the plunger's movement is effected by a motor disposed in the housing portion. The motor may be configured such that it is activated by an RFID-enabled device placed in proximity to the housing portion. In certain embodiments, the motor is an electrically-powered stepper motor.

The anti-theft merchandise hook may include electronic circuitry disposed in the housing portion, the electronic circuitry including an emitter configured to emit at least one of an audible, a visible, and a wireless radio alarm signal. Additionally, embodiments of the invention include a limit switch to track an amount of time that the hanger is in the open position, and to trigger the alarm signal if the hanger remains open for more than a threshold period of time.

In certain embodiments, the mounting portion includes a mounting face with means for locking the anti-theft merchandise hook into a mounted position. The mounting portion may further include a mounting face plunger that is depressed when the mounting portion is mounted flush to a stationary surface, and which triggers an alarm when released mounting face plunger that triggers an alarm when released.

In a further embodiment, the top and/or bottom wire is electrically coupled to the electronic circuitry such that the top and/or bottom wires function as an antenna for the transmission of the wireless radio alarm signal. The anti-theft merchandise hook may also include an alarm box, located remotely from the anti-theft merchandise hook, and configured to receive the wireless radio alarm signal from the emitter and to emit a second alarm, and/or relay the wireless radio alarm signal to another location.

In another aspect, embodiments of the invention provide an anti-theft merchandise hook that includes a top wire connected to a housing at a first end of the top wire, and to a mounting portion, used to mount the anti-theft merchandise hook to a stationary surface, at a second end of the top wire opposite the first end. A bottom wire is attached to the mounting portion and extends from the mounting portion towards the housing. The bottom wire is configured to hold retail merchandise. A hanger is at least partially disposed within the housing. The hanger is configured to move linearly between a closed position in which the hanger abuts the bottom wire, and an open position in which the hanger is spaced some distance from the bottom wire. A motor is configured to drive a rotary shaft in order to move the hanger between the closed position and the open position.

In a particular embodiment, the hanger includes an attached locating guide with a threaded opening configured to accommodate a threaded rotary shaft. In some embodiments, the locating guide extends transversely from an exterior surface of the hanger. In a more particular embodiment, rotation of the shaft in a first rotary direction causes the locating guide to move linearly along the rotary shaft in a first linear direction, and rotation of the shaft in a second rotary direction, opposite the first rotary direction, causes the locating guide to move linearly along the rotary shaft in a second linear direction opposite the first linear direction. In particular embodiments, the movement of the hanger, between the closed position and the open position, is linear along a longitudinal axis of the hanger.

The hanger may be cylindrical. Furthermore, the motor and rotary shaft may be disposed within the housing. In certain embodiments, the hanger has a slot that extends longitudinally along a length of the hanger, and wherein a guide post, attached to the housing, extends through the slot. The aforementioned motor may be a stepper motor. Also, the motor may be battery-powered. In a further embodiment, a pivoting latch extends from the housing to an end of the bottom wire. The pivoting latch is configured to prevent merchandise from inadvertently coming off of the bottom wire. The pivoting latch may be spring biased such that an end of the pivoting latch contacts the end of the bottom wire.

The anti-theft merchandise hook may further include a controller with an RFID reader, where the controller is disposed within the housing. The controller may be configured to operate the motor when an operator RFID card is placed in proximity to the controller. In other embodiments, the controller moves the hanger from the closed position to the open position, or from the open position to the closed position, when the operator RFID card is placed in proximity to the controller. The controller may be further configured to recognize one or more specific operator RFID cards such that controller only operates the motor when the one or more specific operator RFID cards is placed in proximity to the controller. Additionally, the controller may be configured to initialize operation of the anti-theft merchandise hook when a write RFID card is placed in proximity to the controller. Further still, in some embodiments, the controller is configured to enable or disable an operator RFID card when the write RFID card is placed in proximity to the controller for a predetermined length of time.

The anti-theft merchandise hook may further include a reset button which resets the anti-theft merchandise hook when depressed for a threshold period of time. In other embodiments, the anti-theft merchandise hook has an audio emitter and/or a light indicator, and the controller operates the audio emitter and/or light indicator to indicate a status of the anti-theft merchandise hook. Further, the audio emitter or light indicator may be used to indicate at least one of a battery power status, movement of the hanger between the open and closed positions, a reset status, a placement of merchandise onto the bottom wire, or removal of merchandise from the bottom wire.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
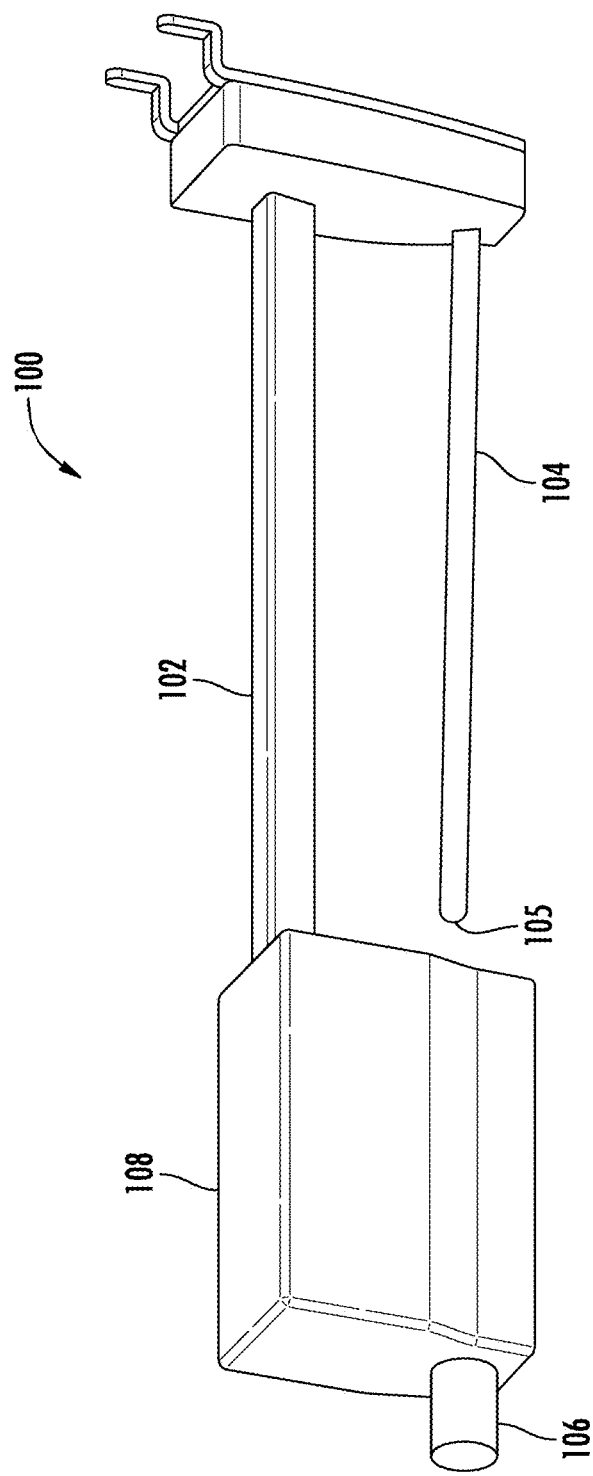
FIG. 1 is a front perspective view of an anti-theft merchandise hook in the open position constructed in accordance with an embodiment of the invention.
Figure 2:
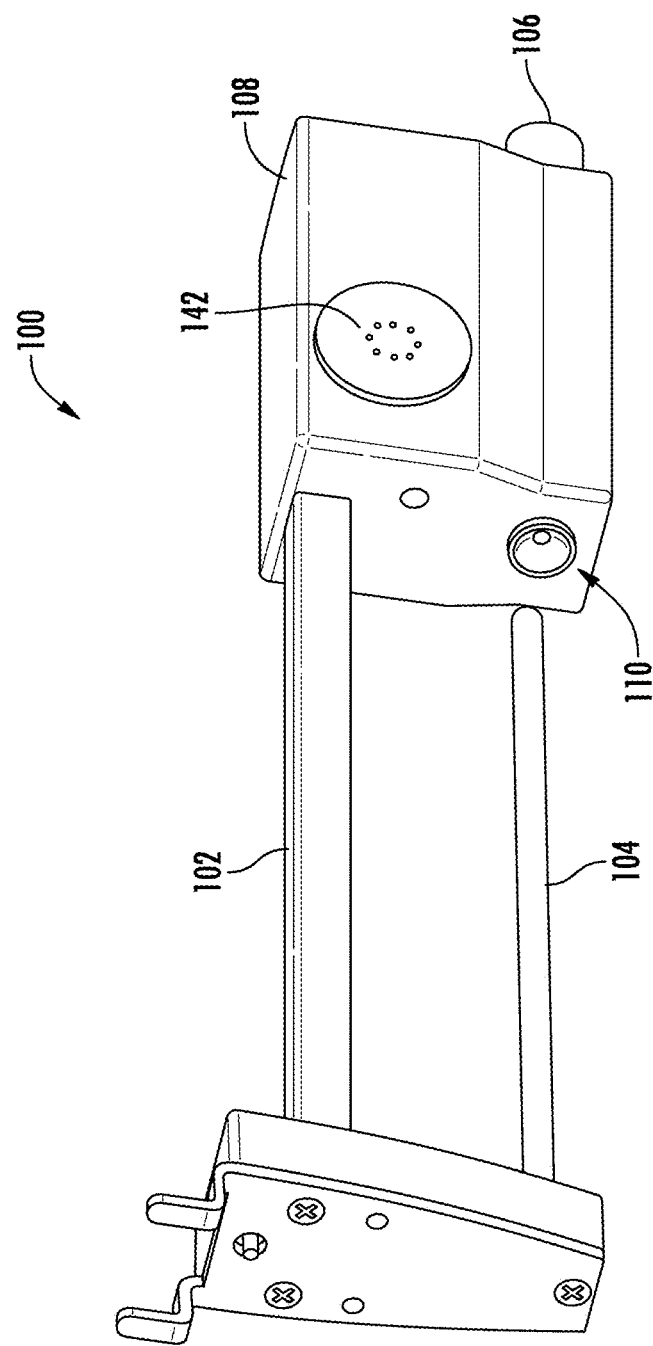
FIG. 2 is a rear perspective view of an anti-theft merchandise hook in the open position constructed in accordance with an embodiment of the invention.
Figure 3:
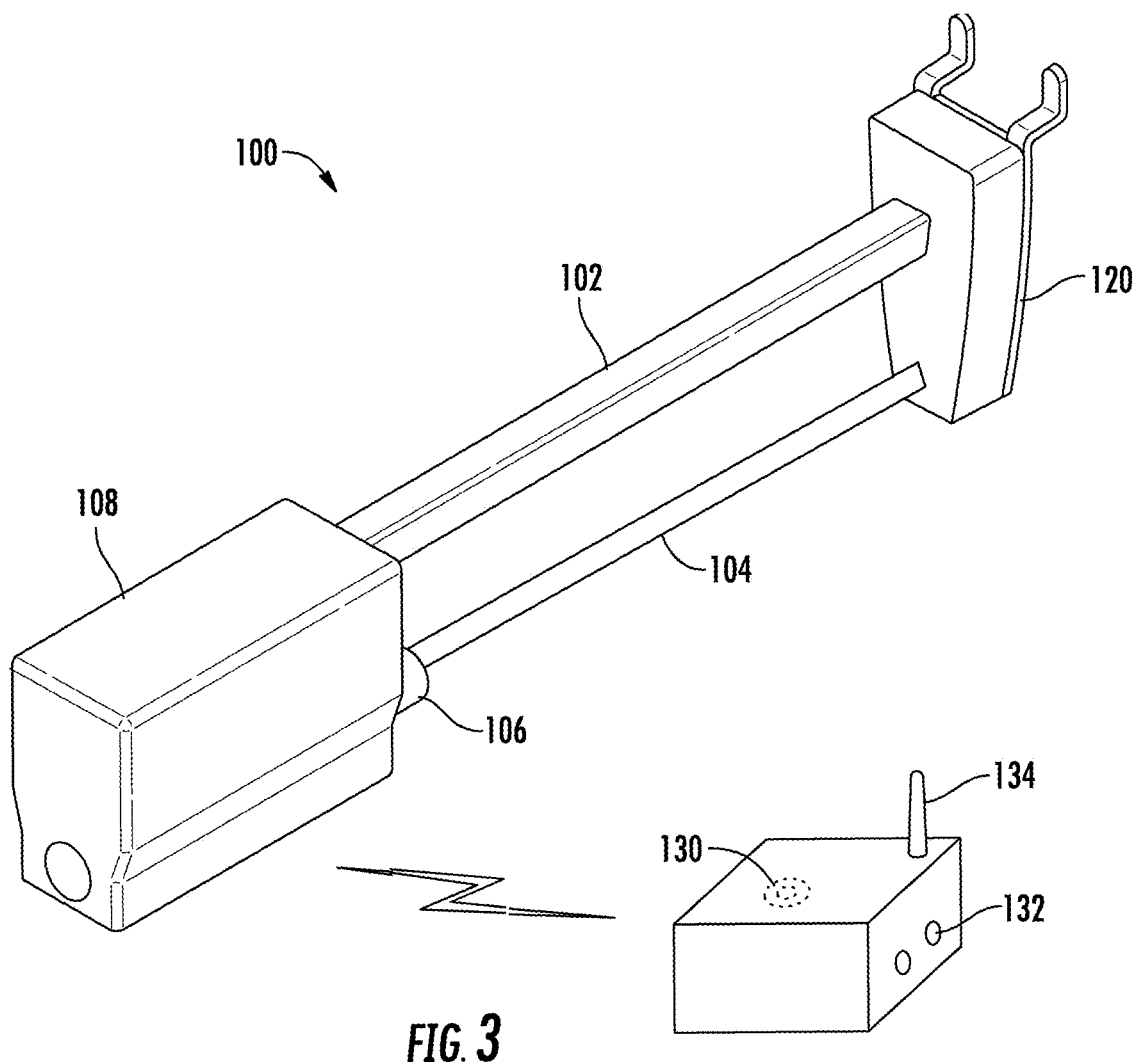
FIG. 3 is a front perspective view of an anti-theft merchandise hook in the closed position constructed in accordance with an embodiment of the invention.
Figure 4:
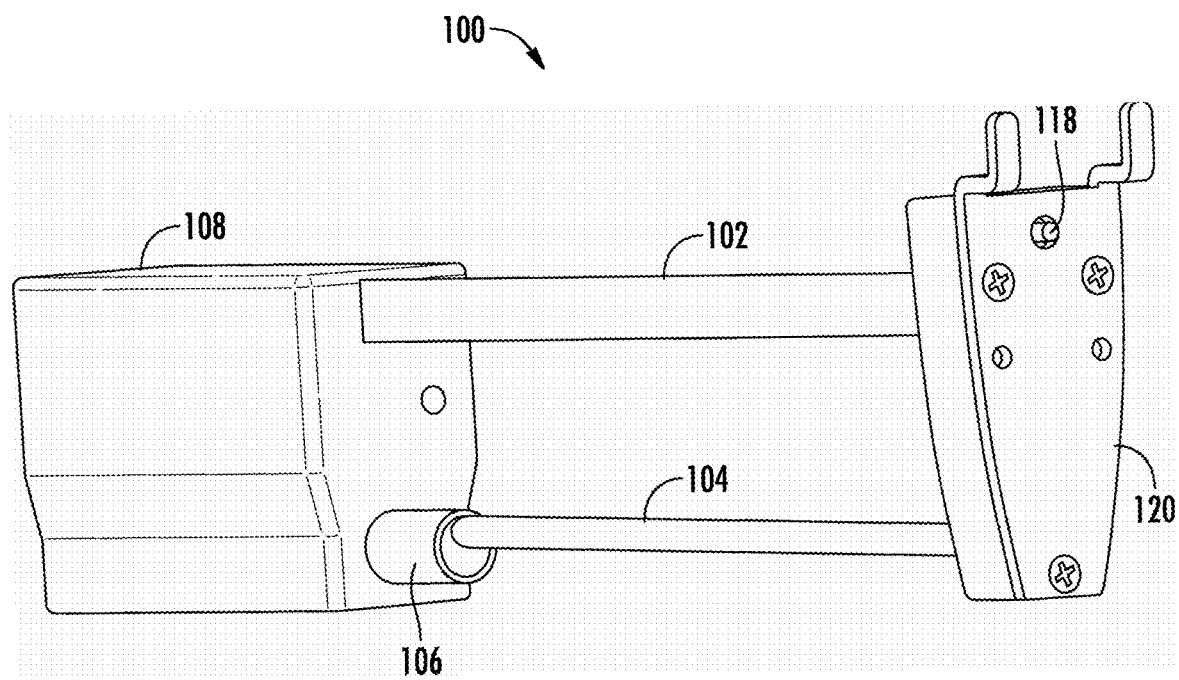
FIG. 4 is a rear perspective view of an anti-theft merchandise hook in the closed position constructed in accordance with an embodiment of the invention.

FIGS. 1 and 2 provide front and rear perspective views of anti-theft merchandise hook 100 in the open position, the anti-theft merchandise hook 100 constructed in accordance with an embodiment of the invention. FIGS. 3 and 4 provide front and rear perspective views of anti-theft merchandise hook 100 in the closed position in accordance with an embodiment of the invention. In certain embodiments, the anti-theft merchandise hook 100 is an RFID-activated merchandise hook with a top wire 102 and a bottom wire 104 on which the merchandise is held, where the bottom wire 104 is shorter in length than the top wire 102.

The anti-theft merchandise hook 100 further includes a spring-biased hanger 106 that is moved laterally back and forth between a closed position in which the hanger 106 is securely abutted to an end of the bottom wire 104, and an open position in which the hanger 106 is separated from the end of the bottom wire 104. In the open position, the space between the hanger 106 and bottom wire 104 allows for merchandise to be removed from the hook 100. In the closed position, no merchandise can be removed. In the embodiments shown, the hanger 106 is substantially cylindrical, though in alternate embodiments, the hanger 106 could be prismatic, curved, spiraled, or some other suitable shape.

Figure 5A:
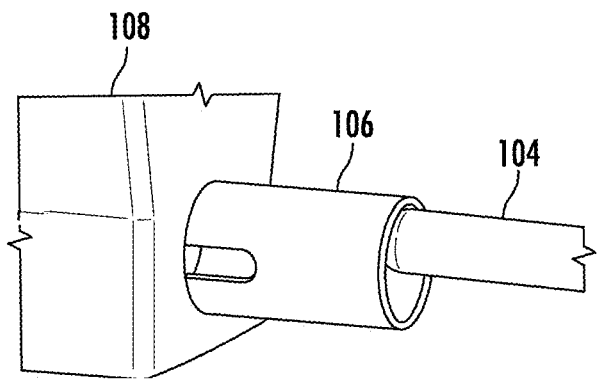
FIGS. 5A and 5B are close up perspective views of the hanger and bottom wire according to an embodiment of the invention.
Figure 5B:
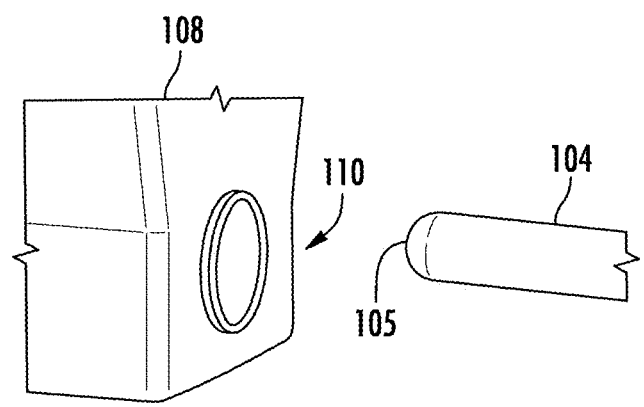

In a particular embodiment of the invention which includes that shown in FIGS. 1-4, the hanger 106 is disposed, at least partially, within a housing 108 of the anti-theft merchandise hook 100. As shown in the embodiments of FIGS. 4, 5A, and 5B, the hanger 106 may have a concave or cup-shaped end 110 configured to abut securely against an end 105 of the bottom wire 104 when the anti-theft merchandise hook 100 is in the closed position. The end 105 of the bottom wire 104 may be convex or rounded to facilitate a fit between the concave cup-shaped end 110 and the end 105 of the bottom wire 104. Thus, the convex end of the bottom wire 104, when abutted with the correspondingly concave end of the hanger 106 provides a secure attachment between the two components such that no merchandise can be removed from the bottom wire 104.

In more particular embodiments, electronic circuitry 140 disposed within the housing 108 is able to detect when the hanger 106 is in contact with the bottom wire 104, and therefore able to determine when the anti-theft merchandise hook 100 is in the closed position. In some embodiments, the electronic circuitry 140 of the anti-theft merchandise hook 100 is battery-powered. Alternate embodiments are envisioned in which the electronic circuitry 140 is powered by means other than a battery, e.g., solar cell, hardwired to building power, etc.

The bottom wire 104 may be made from metal or some similarly conductive material, while some portion of the hanger 106, including a portion that abuts the bottom wire 104, is also made from metal or some similarly conductive material, such that an electrical circuit is formed when the bottom wire 104 and hanger 106 are in contact with each other. The electronic circuitry 140 of the anti-theft merchandise hook 100 may be able to detect when the bottom wire 104 and hanger 106 are in contact with each other based on the formation of this electrical circuit.

Figure 6:
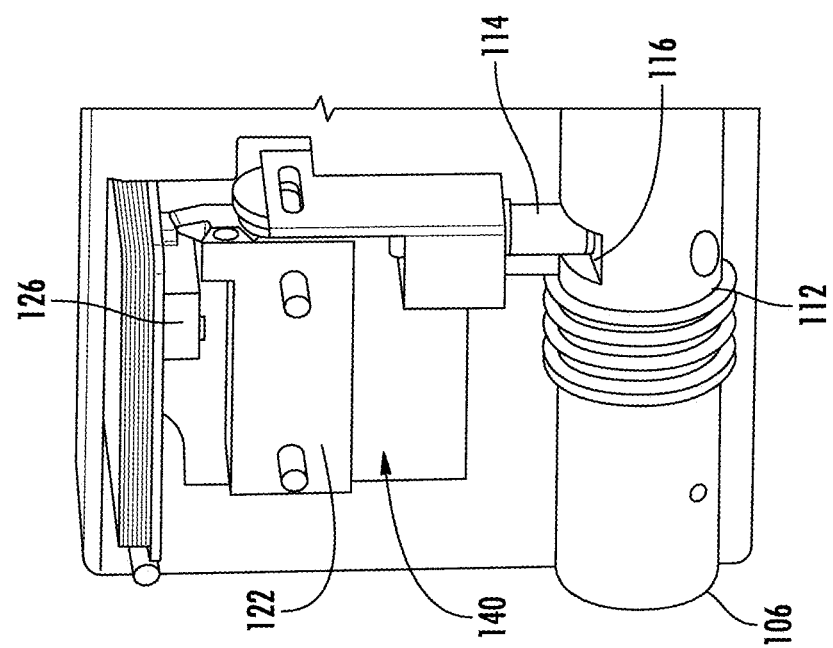
FIG. 6 is a perspective view of the hanger disposed in a housing of the anti-theft merchandise hook in accordance with an embodiment of the invention.
Figure 6:
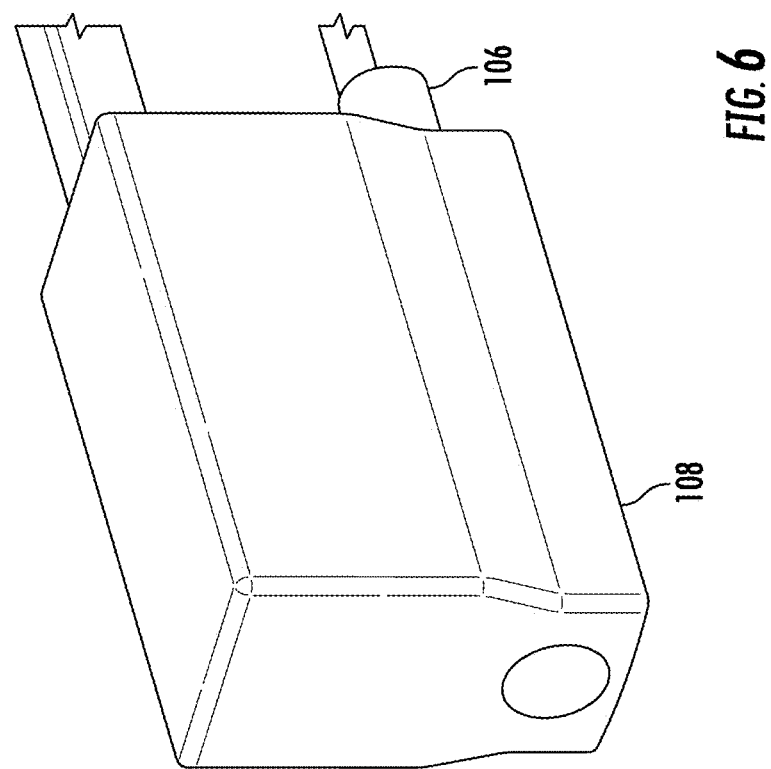

In the embodiment of FIG. 6, a spring 112 is assembled onto the hanger 106 within the housing 108. The spring 112 abuts a surface within the housing 108 such that the spring 112 biases the hanger 106 in the open position. A second end of the hanger 106 opposite the cup-shaped end 110 protrudes from the housing 108. The user pushes on this second end of the hanger 106, against the force of spring 112 in order to bring the hanger 106 in contact with the bottom wire 104, thereby closing the anti-theft merchandise hook 100.

The hanger 106 may then be locked in the closed position by a plunger 114 within the housing 108. In the embodiment shown in FIG. 6, the plunger 114 is substantially cylindrical and arranged perpendicularly to the hanger 106 (in this case vertically with respect to the horizontally-arranged hanger 106), and is seated within a notch 116 cut into a middle portion of the hanger 106 to lock the hanger 106 in place and keep it from moving back to the open position. In alternate embodiments, the plunger 114 could be assume different shapes, e.g., prismatic, that engage the notch 116 to lock the hanger 106 in the closed position.

In the embodiment shown, the plunger 114 is moved back and forth by a small motor 122 disposed within the housing 108. The motor 122 may be an electrically-powered stepper motor. The electronic circuitry 140 in the housing 108 operates the motor 122 in response to an RFID-enabled device, e.g., an RFID card or RFID key (not shown), or other suitable device when placed in proximity to the housing 108. For example, it is contemplated that devices other than RFID-enabled devices (e.g., magnetic, electromagnetic, etc.) may be used to operate the motor 122 and plunger 114. In one particular example, tapping the RFID card on the housing 108 may cause the plunger 114 to seat in the notch 116 of the hanger 106 when the user pushes the hanger 106 into contact with the bottom wire 104. Subsequently, tapping the RFID card on the housing 108 may then cause the plunger 114 to unseat from the notch 116 to open the anti-theft merchandise hook 100.

In a particular embodiment of the invention, a limit switch 126 is disposed in the housing 108 and configured to track the time the anti-theft merchandise hook 100 is in the open position and to issue an alarm if the anti-theft merchandise hook 100 remains in the open position longer than a threshold period of time. For example, the limit switch 126 may be configured such that the anti-theft merchandise hook 100 emits an audible alarm and/or a wireless alarm signal if the anti-theft merchandise hook 100 is in the open position for more than 15 seconds, or even 30 seconds. However, threshold times greater than 30 seconds and lesser than 15 seconds are envisioned. In certain embodiments of the invention, the user may adjust the threshold time limit before the limit switch 126 causes the alarm to issue.

In a further embodiment, the aforementioned RFID-enabled device, when used to tap the housing 108 or placed in close proximity to the housing 108, activates the motor 122 which lifts the plunger 114 out of the notch 116 so that the spring 112 moves the hanger 106 away from the bottom wire 104, thus allowing for the removal of merchandise from the bottom wire 104. The lifting of the plunger 114 depresses and activates the limit switch 126 which starts a timer. After the threshold period of time, if the hanger 106 remains separated from the bottom wire 104, the limit switch 126 may cause anti-theft merchandise hook 100 to issue an alarm. The alarm may issue for a specified period of time, or the alarm may continue until the hanger 106 is urged into contact with the end 105 of the bottom wire 104 and the plunger 114 lowered into the notch 116 to lock the hanger 106 in place.

The electronic circuitry 140 in the housing 108 may include an emitter 142 capable of emitting an audible, visible, and wireless radio alarm signal. Additionally, the top 102 and/or bottom wire 104 may be electrically coupled to the electronic circuitry 140 such that the wire(s) functions as an antenna for the transmission of the signal to the wireless radio alarm signal. In certain embodiments, the wireless radio alarm signal emitted by the electronic circuitry 140 of the anti-theft merchandise hook 100 is configured to be transmitted to an alarm box 128 (see FIG. 3).

In particular embodiments, the alarm box 128 includes a receiver configured to receive a wireless signal from one or more signal-emitting retail display devices. In some embodiments, the alarm box 128 also has an alarm box emitter 130 configured to emit an audible signal indicative of the wireless signal received from the one or more signal-emitting retail display devices, and one or more terminals 132 for connecting the alarm box 128 to an output receiving device. In certain embodiments, the alarm box emitter 130 is also configured to emit a visible signal indicative of the wireless signal received from the one or more signal-emitting retail display devices. In such a case, the alarm box 128 may include one or more LEDs or other light-emitting devices capable of indicating multiple types of alarm conditions or indicating a particular status of one or more anti-theft merchandise hooks 100. Furthermore, the alarm box 128 may also include an antenna 134 for transmitting wireless signals indicative of an alarm condition. The wireless signals may be transmitted to an output receiving device capable of receiving wireless transmission or to some remotely-located receiving station.

Figure 7:
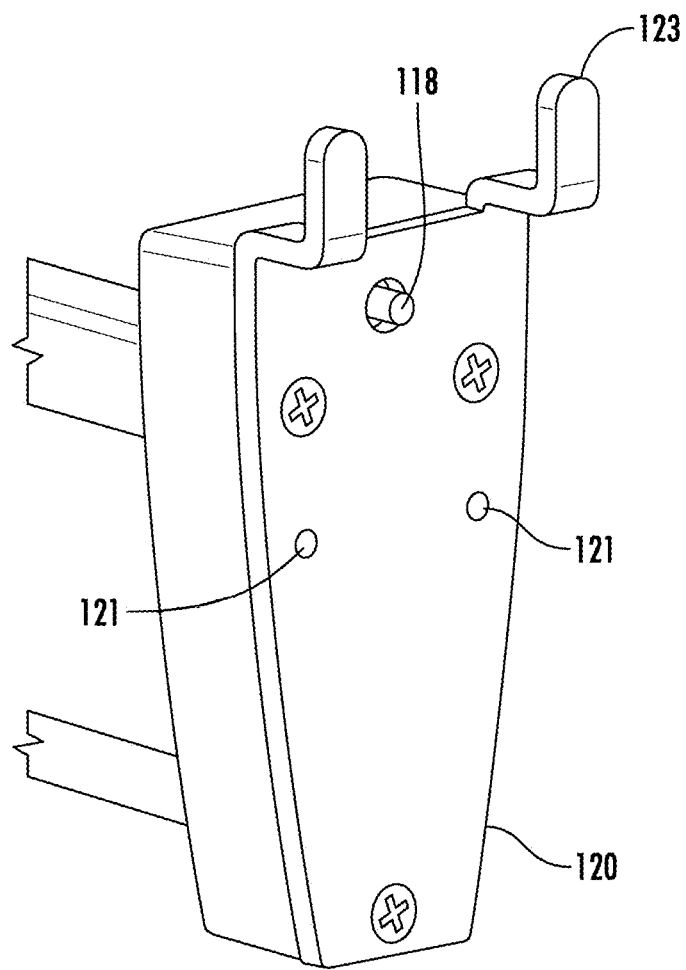
FIG. 7 is a perspective view of the mounting apparatus for the anti-theft merchandise hook according to an embodiment of the invention.

FIG. 7 shows a perspective view of the mounting apparatus 120 for the anti-theft merchandise hook 100 according to an embodiment of the invention. The mounting apparatus 120 of the anti-theft merchandise hook 100 is for mounting or attaching the mounting apparatus 120 to a fixed or stationary surface to fix the position of the anti-theft merchandise hook 100. In the embodiments shown, the mounting apparatus 120 includes one or more openings 121 in which is arranged a mechanical mounting lock 124.

In the embodiments shown, the mounting apparatus 120 includes two mounting projections 123 for securing the anti-theft merchandise hook 100 to a pegboard. In a particular embodiment, the mounting apparatus 120 includes a mounting face plunger 118 that is depressed when the mounting apparatus 120 is secured flush to a stationary surface, such that when the anti-theft merchandise hook 100 is removed from its flush mounting to the stationary surface, the mounting face plunger 118 is released thus triggering an alarm.

Figure 8:
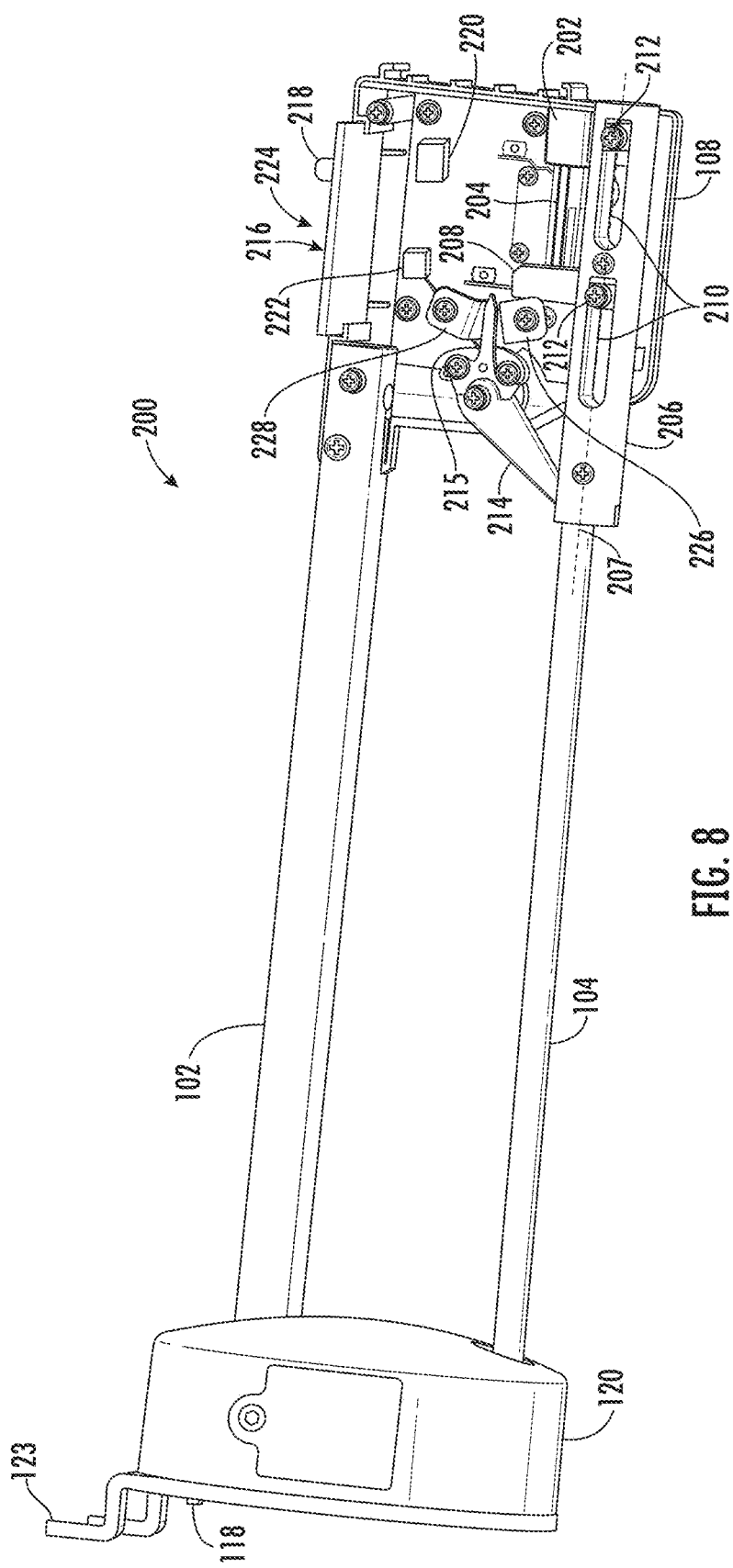
FIG. 8 is a side view of an alternate embodiment of the anti-theft merchandise hook with the housing partially removed and showing the hanger in the closed position.
Figure 9:
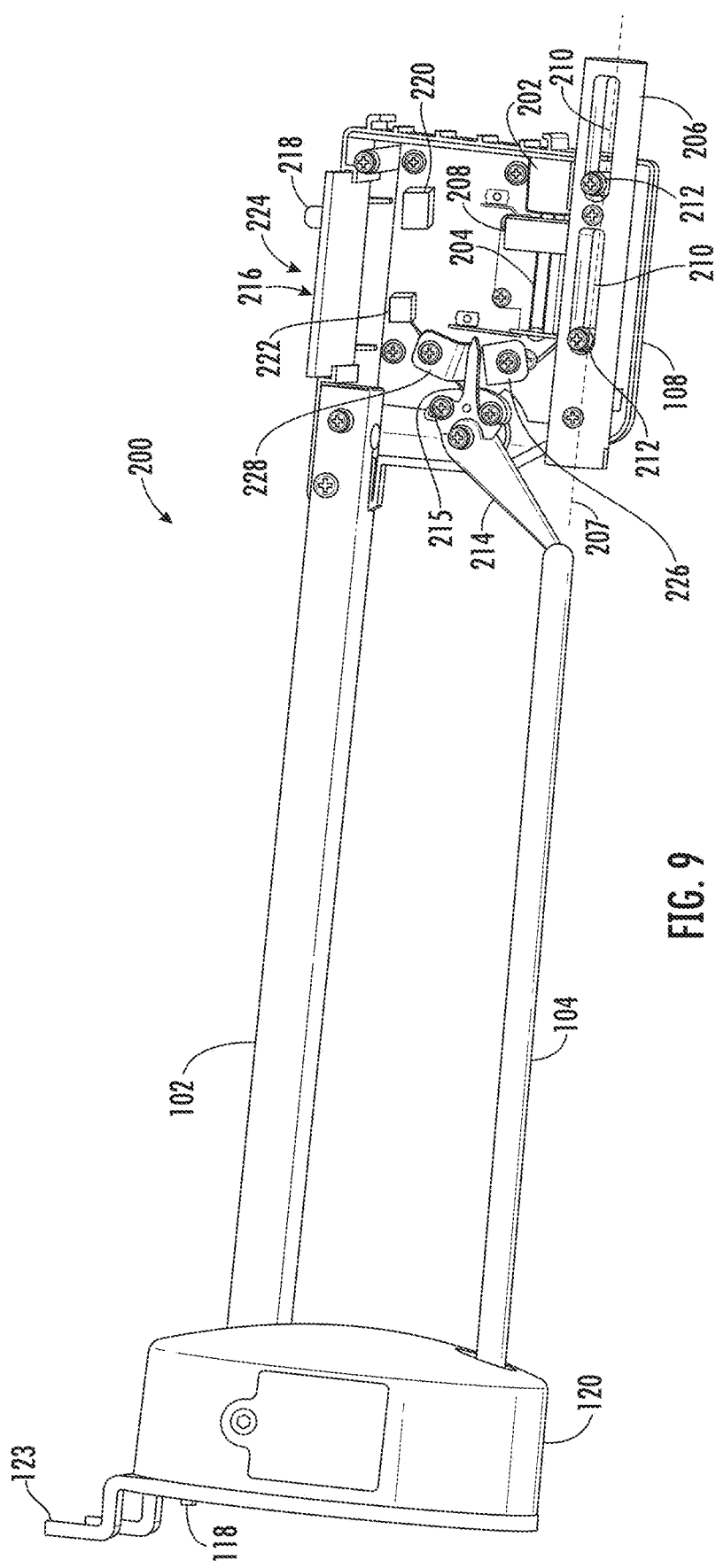
FIG. 9 is a side view of the alternate embodiment of FIG. 8 with the housing partially removed and showing the hanger in the open position.

An alternate embodiment of the anti-theft merchandise hook 200 is shown in FIGS. 8 and 9. FIG. 8 is a side view of the anti-theft merchandise hook 200 with the housing 108 partially removed and showing the hanger 206 in the closed position, while FIG. 9 is a side view of the anti-theft merchandise hook 200 with the housing 108 partially removed and showing the hanger 206 in the open position.

In the embodiment of FIGS. 8 and 9, the hanger 206 is actuated by a stepper motor 202 which drives a rotary shaft 204. In certain embodiments of the invention, the stepper motor 202 and rotary shaft 204 are disposed in the housing 108. The stepper motor 202 may be powered by a battery also disposed in the housing 108. The hanger 206 has an attached locating guide 208 with a threaded opening configured to accept the rotary shaft 204 the exterior surface of which is also threaded. The rotary shaft 204 is threaded into the threaded opening of the locating guide 208. In operation, the stepper motor 202 rotates the rotary shaft 204 causing the locating guide 208 to move linearly along the rotary shaft 204 in a first direction, e.g., clockwise. When the stepper motor 202 rotates the rotary shaft 204 in the opposite direction, e.g., counterclockwise, the locating guide 208 moves in a second direction opposite the first direction. The hanger 206 moves in unison with the locating guide 208 linearly along the rotary shaft 204.

The rotary shaft 204 may have a plate or stop of some kind attached at a distal end (furthest from the stepper motor 202) thereof to prevent the locating guide 208 from coming off of the rotary shaft 204. It is contemplated that certain embodiments may not include a threaded rotary shaft 204. In particular embodiments, a gear arrangement may be used to effect movement of the hanger 206. It should also be noted that the hanger 206 may be actuated by a type of motor other than the stepper motor 202 shown in FIGS. 8 and 9. In various alternate embodiments, it is envisioned that the motor could be a servomotor, a linear motor, a direct drive motor, a DC brushed or brushless motor, etc.

In the embodiment shown, the locating guide 208 is attached towards a central portion of the hanger 206. In this context, the central portion is the portion of the hanger 206 not close to either end of the hanger 206, e.g., the middle third of the hanger 206 taken lengthwise. The embodiment of FIGS. 8 and 9 shows the locating guide extending transversely from a surface of the hanger 206 in a direction that is substantially perpendicular to a longitudinal axis 207 of the hanger 206, where the hanger 206 is cylindrical and the longitudinal axis 207 extends through the hanger 206 from one end to the opposite end. However, it is recognized that, in alternate embodiments of the hanger 206, the locating guide 208 may be attached closer to either end of the hanger 206, and may not extend transversely to the hanger's longitudinal axis 207. Furthermore, in such embodiments, the hanger 206 may be prismatic rather than cylindrical.

In the embodiments shown, the hanger 206 has two slots 210 that extend longitudinally along a length of the hanger 206. In the embodiment shown, the slots 210 define openings that extend through an entire body portion of the hanger 206. The slots 210 are removably assembled onto guide posts 212 attached to the interior of the housing 108. It is understood that alternate embodiments of the hanger 206 may have fewer or more than two slots 210. The two guide posts 212 extend through each of the two slots 210. The slots 210 define the range of linear movement for the hanger 206 as movement of the hanger 206 stops when the ends of the slots 210 contact the guide posts 212. The width of the slots 210 are only slightly larger than the diameter of the guide posts 212, thus ensuring that the hanger 206 can only move linearly within the housing 108. In such an embodiment, the movement of the hanger 206, between the closed position and the open position, is linear along a longitudinal axis 207 of the hanger 206.

As can be seen in FIG. 8, the hanger 206 is in the closed position due to the stepper motor 202 having driven the rotary shaft 204 in a first rotary direction in order to move the locating guide 208 to the distal end (furthest from the stepper motor 202) of the rotary shaft 204 such that the hanger 206 comes into contact with the end 105 of the bottom wire 104. FIG. 9 shows the hanger 206 is in the open position due to the stepper motor 202 having driven the rotary shaft 204 in a second rotary direction opposite the first rotary direction in order to move the locating guide 208 to a proximal end (closest to the stepper motor 202) of the rotary shaft 204 such that the hanger 206 is spaced some distance from the bottom wire 104.

Embodiments of the anti-theft merchandise hook 100 further include a controller 220 coupled to an RFID reader 222, where the controller 220 and RFID reader 222 are disposed within the housing 108. The controller 220 may be configured to operate the motor 202 when an operator RFID card (not shown) is placed in proximity to the controller 220. In other embodiments, the controller 220 moves the hanger 206 from the closed position to the open position, or from the open position to the closed position, when the operator RFID card is placed in proximity to the controller 220. In a particular embodiment of the invention, the term "in proximity" to the controller 220, as used herein, means within 12 inches of the controller 220. In another embodiment, the term "in proximity" to the controller 220, as used herein, means within six inches of the controller 220. In yet another embodiment, the term "in proximity" to the controller 220, as used herein, means within three inches of the controller 220.

The controller 220 may be further configured to recognize one or more specific operator RFID cards such that controller 220 only operates the motor 202 when the one or more recognized specific operator RFID cards is placed in proximity to the controller 220. Additionally, the controller 220 may be configured to initialize operation of the anti-theft merchandise hook 100 when a write RFID card (not shown) is placed in proximity to the controller 220. Furthermore, it is envisioned that, in some embodiments of the invention, the controller 220 is configured to enable or disable an operator RFID card when the write RFID card is placed in proximity to the controller 220 for a predetermined length of time.

In the embodiment shown in FIGS. 8 and 9, a pivoting latch 214 extends from within the housing 108 to the end 105 of the bottom wire 104. The pivoting latch 214 prevents merchandise from inadvertently falling off of the bottom wire 104 when the hanger 206 is in the open position. A user can remove an item by pulling the item from the anti-theft merchandise hook 100 causing the pivoting latch 214 to rotate away from the end 105 of the bottom wire 104. Following the removal of the item, the pivoting latch 214 is spring-biased, in certain embodiments, so as to pivot back such that the end of the latch 214 returns to the end 105 of the bottom wire 104. Other embodiments of the anti-theft merchandise hook 100 may exclude the pivoting latch 214.

In a particular embodiment, the pivoting latch 214 is configured to pivot upward when loading merchandise onto the bottom wire 104, and to pivot downward when removing merchandise from the bottom wire 104. A conductive pointer 215 is attached to the rotating end of the pivoting latch 214 that is attached within the housing 108. When the pivoting latch 214 pivots upward, the conductive pointer 215 rotates downward and contacts a first electrical contact 226. In certain embodiments, each time the conductive pointer 215 contacts the first electrical contact 226, a signal is sent to the controller 220 causing the controller 220 to add one to the count of the number of items on the bottom wire 104 of the anti-theft merchandise hook 100.

Similarly, when the pivoting latch 214 pivots downward, the conductive pointer 215 rotates upward and contacts a second electrical contact 228. Each time the conductive pointer 215 contacts the second electrical contact 228, a signal is sent to the controller 220 causing the controller 220 to subtract one from the count of the number of items on the bottom wire 104 of the anti-theft merchandise hook 100. In this way the controller 220 keeps an ongoing and real time account of the number of items on any particular anti-theft merchandise hook 100.

In other embodiments, the anti-theft merchandise hook 100 has an audio emitter 216 and/or a light indicator 224, which may be one or more LEDs set into the housing 108. The controller 220 operates the audio emitter 216 and/or light indicator 224 to indicate a particular status of the anti-theft merchandise hook 100. Further, the audio emitter 216 or light indicator 224 may be used to indicate at least one of a battery power status, movement of the hanger 206 between the open and closed positions, a reset status, a placement of merchandise onto the bottom wire 104, or removal of merchandise from the bottom wire 104.

The addition or removal of an item from the bottom wire 104 may be accompanied by a specific sound or pattern of beeps from the audio emitter 216, or a unique pattern of flashing lights from the light indicator 224.

The following provides one example of how the anti-theft merchandise hook 100 may be used in operation. After attaching the anti-theft merchandise hook 100 to a wall or retail display case, the write RFID card is placed in proximity to the controller 220. The emitter 216 will issue a series of beeps or light indicator 224 will flash in a particular patter to indicate that the anti-theft merchandise hook 100 is ready for operation.

In one instance, when items are to be added to the anti-theft merchandise hook 100 and the hanger 206 is in the closed position; the items may be loaded onto the bottom wire 104 of the anti-theft merchandise hook 100 by placing an operator RFID card in proximity to the controller 220 causing the hanger 206 to move to the open position. As indicated above, these movements, and any other movements of the hanger 206 described below, may be accompanied by unique sound patterns from the emitter 216 or flashing light patterns from the light indicator 224. When loading of the items is completed, the operator RFID card is again placed in proximity to the controller 220 causing the hanger 206 to move to the closed position. In particular embodiments, the hanger 206 will remain in the open position while loading items onto the bottom wire 104. However, the controller 220 may be programmed to cause the hanger 206 to automatically move to the closed position if no loading occurs for a threshold period of time.

Similarly, when items are to be removed from the anti-theft merchandise hook 100 and the hanger 206 is in the closed position; the items may be removed from the bottom wire 104 of the anti-theft merchandise hook 100 by placing an operator RFID card in proximity to the controller 220 causing the hanger 206 to move to the open position. When removal of the items is completed, the operator RFID card is again placed in proximity to the controller 220 causing the hanger 206 to move to the closed position. In particular embodiments, the hanger 206 will remain in the open position during removal of the items from the bottom wire 104. However, the controller 220 may be programmed to cause the hanger 206 to automatically move to the closed position if no items are removed for a threshold period of time. Additionally, the controller 220 may be programmed to issue an alarm if too many items are removed within a predetermined period of time.

The write RFID card, used to initialize operation of the anti-theft merchandise hook 100, may also be used to enable or disable use of an operator RFID card. In a particular example, one or more operator RFID cards may be linked to an anti-theft merchandise hook 100 when the write RFID card is placed in proximity to the controller 220 until the audio emitter 216 or light indicator 224 shows a first unique pattern indicating that an operator RFID card is ready to be enabled, or a second unique pattern, different from the first, indicating that an operator RFID card is ready to be disabled or erased from the system, i.e., the memory of the controller 220. Once enabled, the operator RFID card is recognized by the controller 220, and can be used to open or close the hanger 206 of the anti-theft merchandise hook 100. A disabled operator RFID card is no longer recognized by the controller 220, and therefore cannot be used to open or close the hanger 206.

The anti-theft merchandise hook 100 may further include a reset button 218 which resets the anti-theft merchandise hook 100 when depressed for a threshold period of time. In reset mode, the anti-theft merchandise hook 100 is not ready for operation, and must be initialized using the write RFID card. When the anti-theft merchandise hook 100 is reset, the audio emitter 216 or light indicator 224 may provide a unique pattern of sounds or flashing lights to indicate the reset status.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An anti-theft merchandise hook comprising:
   a top wire connected to a housing and to a mounting portion, used to mount the anti-theft merchandise hook, at an end of the top wire;
   a bottom wire attached to the mounting portion and extending from the mounting portion towards the housing, the bottom wire configured to hold retail merchandise;
   a hanger at least partially disposed within the housing, the hanger configured to move between a closed position in which the hanger abuts the bottom wire, and an open position in which the hanger is spaced some distance from the bottom wire; and
   a motor configured to move the hanger between the closed position and the open position.

2. The anti-theft merchandise hook of claim 1, wherein the hanger includes an attached locating guide with a threaded opening configured to accommodate a threaded rotary shaft.

3. The anti-theft merchandise hook of claim 2, wherein the locating guide extends transversely from an exterior surface of the hanger.

4. The anti-theft merchandise hook of claim 2, wherein rotation of the shaft in a first rotary direction causes the locating guide to move linearly along the rotary shaft in a first linear direction, and rotation of the shaft in a second rotary direction, opposite the first rotary direction, causes the locating guide to move linearly along the rotary shaft in a second linear direction opposite the first linear direction.

5. The anti-theft merchandise hook of claim 1, wherein the hanger is cylindrical.

6. The anti-theft merchandise hook of claim 1, wherein the motor is disposed within the housing.

7. The anti-theft merchandise hook of claim 1, wherein the hanger has a slot that extends longitudinally along a length of the hanger, and wherein a guide post, attached to the housing, extends through the slot.

8. The anti-theft merchandise hook of claim 1, wherein the motor is a stepper motor.

9. The anti-theft merchandise hook of claim 1, further comprising a pivoting latch that extends from the housing to an end of the bottom wire, the pivoting latch configured to prevent merchandise from inadvertently coming off of the bottom wire.

10. The anti-theft merchandise hook of claim 9, wherein the pivoting latch is spring biased such that an end of the pivoting latch contacts the end of the bottom wire.

11. The anti-theft merchandise hook of claim 1, wherein the motor is battery-powered.

12. The anti-theft merchandise hook of claim 1, wherein the movement of the hanger, between the closed position and the open position, is linear along a longitudinal axis of the hanger.

13. The anti-theft merchandise hook of claim 1, further comprising a controller with an RFID reader, the controller being disposed within the housing.

14. The anti-theft merchandise hook of claim 13, wherein the controller is configured to operate the motor when an operator RFID card is placed in proximity to the controller.

15. The anti-theft merchandise hook of claim 14, wherein the controller moves the hanger from the closed position to the open position, or from the open position to the closed position, when the operator RFID card is placed in proximity to the controller.

16. The anti-theft merchandise hook of claim 13, wherein the controller is configured to recognize one or more specific operator RFID cards such that controller only operates the motor when the one or more specific operator RFID cards is placed in proximity to the controller.

17. The anti-theft merchandise hook of claim 13, wherein the controller is configured to initialize operation of the anti-theft merchandise hook when a write RFID card is placed in proximity to the controller.

18. The anti-theft merchandise hook of claim 17, wherein the controller is configured to enable or disable an operator RFID card when the write RFID card is placed in proximity to the controller for a predetermined length of time.

19. The anti-theft merchandise hook of claim 1, further comprising a reset button which resets the anti-theft merchandise hook when depressed for a threshold period of time.

20. The anti-theft merchandise hook of claim 1, further comprising an audio emitter and/or a light indicator, wherein the controller operates the audio emitter and/or light indicator to indicate a status of the anti-theft merchandise hook.

21. The anti-theft merchandise hook of claim 20, wherein the audio emitter or light indicator is used to indicate at least one of a battery power status, movement of the hanger between the open and closed positions, a reset status, a placement of merchandise onto the bottom wire, or removal of merchandise from the bottom wire.

22. The anti-theft merchandise hook of claim 1, wherein the motor drives a rotary shaft in order to move the hanger between the closed position and the open position.

* * * * *